United States Patent
Monson et al.

(10) Patent No.: US 6,749,924 B2
(45) Date of Patent: Jun. 15, 2004

(54) STACKED SHEET SHOCK ABSORBING ELASTOMERIC DEVICE

(75) Inventors: Robert J. Monson, St. Paul, MN (US); Trevor J. McCollough, Minneapolis, MN (US); Wesley E. Revely, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/142,387

(22) Filed: May 9, 2002

(65) Prior Publication Data

US 2003/0211283 A1 Nov. 13, 2003

(51) Int. Cl.7 ............................... B32B 3/10; F16F 7/00; F16M 13/00
(52) U.S. Cl. .................. 428/137; 428/131; 267/140.11; 267/141; 267/160; 267/292; 248/636; 248/638; 181/207; 181/208
(58) Field of Search ................................ 428/131–140; 267/141, 140.11, 292, 160; 248/636, 638; 181/207, 208

(56) References Cited

U.S. PATENT DOCUMENTS

| | | | |
|---|---|---|---|
| 3,900,628 A | * 8/1975 | Stewart | 428/134 |
| 4,600,622 A | * 7/1986 | Carlson et al. | 428/135 |
| 4,963,412 A | * 10/1990 | Kokeguchi | 428/137 |
| 5,766,720 A | 6/1998 | Yamagishi et al. | |

* cited by examiner

Primary Examiner—Harold Pyon
Assistant Examiner—Patricia L. Nordmeyer
(74) Attorney, Agent, or Firm—Kevin W. Cyr; Patrick M. Hogan

(57) ABSTRACT

A stack of sheet elastomers, each having multiple holes therein, dissipates shock forces applied to it. The elastomeric sheets are formed with identical holes each of which have a periphery that is symmetrical around the centers of the holes that extend over a shock dissipation area of the device. The sheets are stacked so that one, or more continuous material passageways are formed through the stack that extend from one support surface to a parallel support surface. This allows for the elastomer material of these passageways to transmit sheer shock forces when a compressive force is applied normal to the support surfaces. Elastomeric, or other material of a composition different, preferably elastomeric, from the material of the stacked sheets, may be filled into holes of the sheets to adjust the characteristics of the device.

4 Claims, 1 Drawing Sheet

STACKED SHEET SHOCK ABSORBING ELASTOMERIC DEVICE

BACKGROUND OF THE INVENTION

The invention relates to elastomeric damping elements for controlling and minimizing the harmful effects of shock and vibration on electronic and other equipment and components.

Elastomeric materials are employed extensively in applications were shock and vibration must be minimized. Such applications include sports equipment, tools, automobiles, airplanes, electronic equipment and components and many other types of apparatus. It is also becoming increasingly important to minimize failures due to impact forces applied to electronic equipment, such as digital computers, specially when such equipment is employed in harsh, rugged environments.

Previously, various elastomeric materials has been used or suggested for use to provide shock and/or vibration damping, as stated in U.S. Pat. No. 5,766,720 issued Jun. 16, 1998 to Yamagishi. These materials include natural rubbers and synthetic resins, such as polyvinylchlorides, polyurethane, polyamides, polystyrenes, copolymerized polyvinyl chlorides, and polyolefine synthetic rubbers, as well as synthetic materials such urethane, EPDM, styrene-butadine rubbers, nitrites, isoprene, chloroprenes, polylene, and silicones.

The elastomeric elements employed in the prior art were commonly formed into typical geometric shapes, such as spheres, squares, right circular cylinders, cones, rectangular, and the like, as illustrated in U.S. Pat. No. 5,776,720. These typical geometric shapes, however, did not satisfactorily eliminate the transfer of compressive forces through the damping device, and thus, did not minimize, or eliminate shock and vibration to the degree accomplished by the devices of the present invention.

In a pending U.S. patent application, Ser. No. 09/495,693 entitled "Elastomeric Damping Elements and Applications for Reducing Shock and Vibration," elastomeric damping elements of block shapes were disclosed. These elastomeric damping elements were formed to have an elongated parallelogram cross-sectional shape with a first flat mounting surface that extended parallel to a second flat mounting surface where the parallelogram cross-section of the element and was constructed so that a line drawn normal to one of the flat mounting surfaces would not intercept the other of the flat mounting surfaces. As an option, a space in the interior of the element could be provided, which is filled with particulate or fluid matter that may be contained in a deformable package. Materials that have a different damping characteristic than the elastomeric device itself, may be poured in fluid form into the interior of the element where they solidify.

Pending U.S. patent application Ser. No. 09/770,474 entitled "Elastomeric Damping Sheets," discloses elastomeric sheet material that was formed of a continuous, flat elastomeric sheet or layer that has the plurality of channels that run through it, or at least partly through it. The remaining material was formed with a plurality of structures that when viewed alone, a cross-sectional cutting line formed a number of interconnected elastomeric damping elements each of which had a generally parallelogram cross-sectional shape.

BRIEF SUMMARY OF THE INVENTION

A structure for dissipating forces applied to it includes a number of stacked elastomeric sheets which are formed with identical holes that have a periphery that is symmetrical around its centers. The sheets are stacked so that the passageways of continuous elastomeric material are formed through said structure. When the sheets are stacked, the passageways are aligned in such a way that center lines through the centers of holes in different levels of the stack of sheets form parallel lines that pass on opposite sides of continuous elastomer material paths at least one of which extends from one external support surface to a parallel support surface on the opposite side of the stack of sheets, this allows for dissipation of shock through sheer forces when a compressive force is applied normal to the support surfaces. An elastomeric material of a different composition than the elastomer material of the sheets, may be filled into the holes of the stack when the stack construction is completed.

BRIEF DESCRIPTION OF THE SEVERAL VIEWS OF THE DRAWINGS

The present invention is described by reference to the drawings in which.

DETAILED DESCRIPTION OF THE INVENTION

U.S. patent application Ser. No. 09/770,474, is hereby incorporated by reference in this application.

Figure 1:
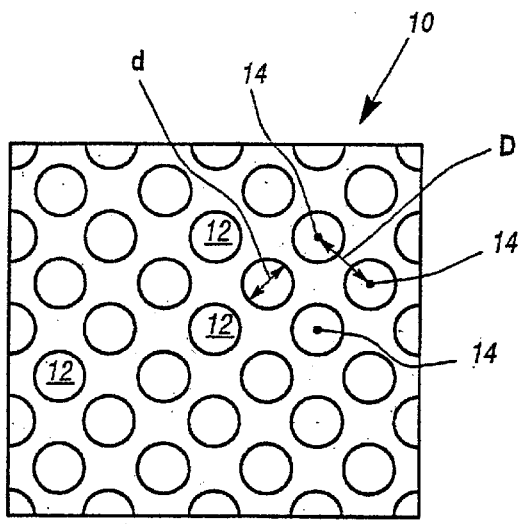
FIG. 1 is a top plain view of an elastomeric sheet with a pattern of identical shaped holes spaced in a consistent manner to construct the composite elastomeric shock absorbing device of the invention.
Figure 2:
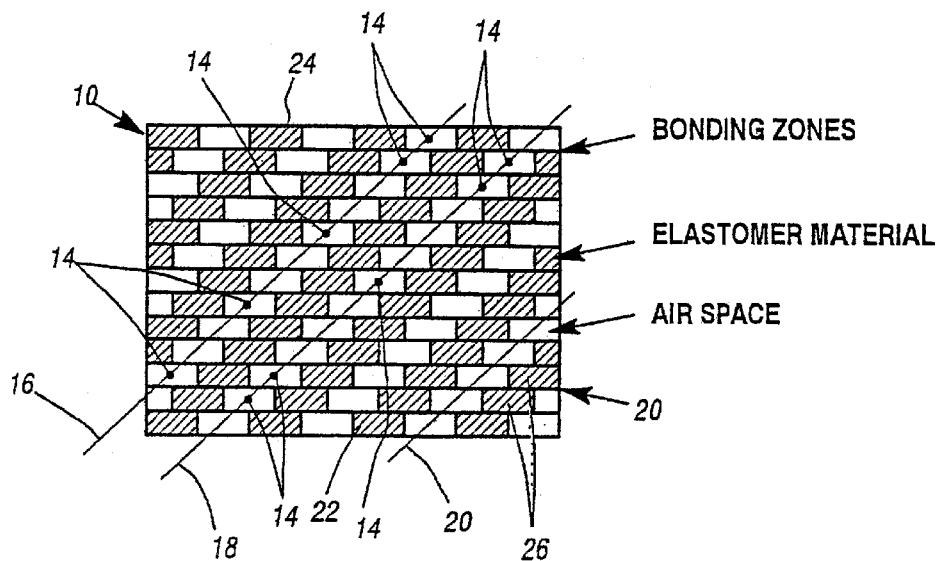
FIG. 2 is a side view of an elastomer shock absorber that is formed by stacked layers of the elastomeric sheets of FIG. 1.

FIG. 1 shows a elastomeric sheet 10 that has an array of a circular 12 holes in it. The holes 12 are identical, and are spaced so that each of these centers 14 is spaced apart from its adjacent neighboring centers. Preferably, the separation distance D between the centers of neighboring circular holes is equal to the diameter "d" of the holes. Although the holes in FIG. 2 are circular in shape, holes of other geometrical shapes including square, hexagonal, octagonal, and other shapes which are symmetrical about the centroids of the shape of the hole, may be employed in the invention. The preferred use of the invention is for applications where the sheets are laid over a large, flat surface that extends over an appreciable area. The area does not have to be square or rectangular since the sheets can be cut to conform to a desired peripheral shape. FIG. 1 illustrates a sheet of limited dimensions which, when stacked in accordance with the present invention, would provide a minimal embodiment of the invention for the preferred use. The preferred use is explained further in connection with FIG. 2.

The sheets are stacked upon each other as shown in FIG. 2. The centers 14 of the holes in the individual sheets 10 are aligned in the offset manner depicted in FIG. 2 such that a center line 16 that runs through the centers of one set of holes that are along the line 16. This provides a passage through the stacked structure 20 that is parallel to other center lines, such as 18, 20 that run through the centers of other sets of holes to provide a plurality of parallel passageways through the stacked structure 20.

If the lower surface 22 of the stacked structure is placed on a solid base, and a downward compressive force is applied to the upper surface 24 of the stacked structure, the force will be dissipated, at least in part, through sheer forces in the stacked structure 20 of the elastomeric material that exists between the two lines 16 and 18. In the minimal embodiment of FIG. 2, the material between lines 16 and 18 is the only material shown in FIG. 2 that extends all of the way from the top surface 24 to the bottom surface 22 in a continuous manner. Therefore, it is the elastomeric material in the stack that is shown in FIG. 2 that most effectively dissipates compressive forces by translating them into sheer forces. Air spaces at the top or bottom surface also limit the effectiveness of the stack structure for the intended use.

As the dimensions of the sheets of FIG. 1 are extended in both its length and width dimensions, the stacked devices includes more continuous material paths, such as the one between the lines 16 and 18, in both the length and width directions. The ratio of effective continuous material paths to non-continuous material paths instead of being a small number, such as 1 to 7, as shown in FIG. 2, then becomes substantially larger.

The sheets of the device do not have to be square, or rectangular, or conform to a desired peripheral shape. The peripheral shape will be a factor in the number of non-continuous material paths the structure will have. The thickness of each sheet and the number of sheets will also be factors in determining the continuous to non-continuous material path ratio, which is consistent with cost, manufacturability, ease of assembly, the required thickness of the structure and other material factors for a given embodiment.

The elastomeric device of the invention is relatively inexpensive to produce since the holes in the sheets may be punched out simultaneously in large numbers, or may initially be simultaneously formed with the sheets. The punched out material can then be recycled to form new sheets, or other parts. The device is quite adaptable to different applications since the number of sheets, their thickness, the size and shape of the holes, the type of material of which the sheets are made, and the possibility of adjusting device characteristics by filling the holes in the stacked layers with a different material, preferably elastomer, all contribute to the versatility of the device. The layers 10 may be bonded in some conventional manner where solid elastomeric elements overlaps, or they be merely laid on top of each other without bonding for certain applications.

We claim:

1. A structure comprising a plurality of elastomeric sheets wherein:
    (a) each of said elastomeric sheets is formed with a multitude of uniformly spaced holes each of which have a periphery that is symmetrical about its center; and
    (b) said sheets are stacked upon each other in layers such that at least one passageway of continuous elastomeric material is formed through said structure from a first exterior surface to a second exterior surface parallel to said first exterior surface for dissipating compressive forces applied normal to said first and second exterior surfaces, wherein each of said passageways are located between two parallel lines that extend through the centers of holes of all of the different layers of elastomeric sheets and wherein said parallel lines form an obtuse angle with said first and said second exterior surfaces.

2. A structure as claimed in claim 1, wherein said holes are circular and the diameter of said holes is equal to the distance between their centers and the centers of adjacent neighboring holes.

3. A structure as claimed in claim 1, wherein at least some of said holes are filled with a material of a different material than the elastomeric material of which said sheets are composed.

4. A structure as claimed in claim 3, wherein said holes are circular and the diameter of said holes is equal to the distance between their centers and the centers of adjacent neighboring holes.

* * * * *